United States Patent
Akhbarizadeh et al.

(10) Patent No.: US 10,505,854 B2
(45) Date of Patent: Dec. 10, 2019

(54) BUFFER CIRCUITRY FOR MONITORING NETWORK ELEMENT STATUS

(71) Applicant: AVAGO TECHNOLOGIES INTERNATIONAL SALES PTE. LIMITED

(72) Inventors: Mohammad Jafar Akhbarizadeh, San Jose, CA (US); Mark David Griswold, Fremont, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 386 days.

(21) Appl. No.: 14/660,397

(22) Filed: Mar. 17, 2015

(65) Prior Publication Data

US 2016/0248689 A1 Aug. 25, 2016

Related U.S. Application Data

(60) Provisional application No. 62/118,870, filed on Feb. 20, 2015.

(51) Int. Cl.
*H04L 12/835* (2013.01)
*H04L 12/26* (2006.01)
*H04L 12/823* (2013.01)

(52) U.S. Cl.
CPC .......... *H04L 47/30* (2013.01); *H04L 43/0817* (2013.01); *H04L 47/32* (2013.01)

(58) Field of Classification Search
CPC ............. H04L 12/2602; H04L 41/0622; H04L 41/0677; H04L 41/22; H04L 43/06; H04L 43/0805; H04L 63/0263; H04L 67/36; H04L 69/329; H04L 43/0817; H04L 47/30; H04L 47/32

See application file for complete search history.

(56) References Cited

U.S. PATENT DOCUMENTS

| | | | | |
|---|---|---|---|---|
| 2003/0229693 | A1* | 12/2003 | Mahlik | G06F 11/3466 709/224 |
| 2005/0276385 | A1* | 12/2005 | McCormick | H04L 12/2602 379/1.02 |
| 2007/0110053 | A1* | 5/2007 | Soni | H04L 63/0263 370/389 |
| 2009/0282297 | A1* | 11/2009 | Anna | G06F 11/0727 714/48 |
| 2009/0287903 | A1* | 11/2009 | Hsu | G06F 8/4442 711/213 |

(Continued)

*Primary Examiner* — Michael Thier
*Assistant Examiner* — Prince A Mensah
(74) *Attorney, Agent, or Firm* — Xsensus, LLP

(57) ABSTRACT

A system includes a pre-trigger buffer and a post-trigger buffer for recording entries related to specific network element. Buffer management monitoring circuitry captures entries leading up to a trigger criterion being met in the pre-trigger buffer and entries following the trigger criterion being met in the post-trigger buffer. The trigger criterion may include network element status, such as a threshold queue level; or an event, such as a dropped packet. The pre-trigger buffer may include a circular buffer in which older entries are overwritten by newer entries. Once the trigger condition is met, the pre-trigger buffer contents are held while the post-trigger buffer fills. Once the post-trigger buffer fills, the contents of the buffers may be read.

15 Claims, 5 Drawing Sheets

(56) References Cited

U.S. PATENT DOCUMENTS

| | | | |
|---|---|---|---|
| 2010/0281308 A1* | 11/2010 | Xu .................... | G06F 11/3636 |
| | | | 714/45 |
| 2011/0270957 A1* | 11/2011 | Phan .................. | H04L 41/0622 |
| | | | 709/221 |
| 2012/0051228 A1* | 3/2012 | Shuman ............. | H04L 41/0677 |
| | | | 370/242 |
| 2013/0246677 A1* | 9/2013 | Ozawa ................ | G06F 13/366 |
| | | | 710/113 |
| 2016/0224804 A1* | 8/2016 | Carasso ............. | G06F 21/6254 |

* cited by examiner

BUFFER CIRCUITRY FOR MONITORING NETWORK ELEMENT STATUS

PRIORITY CLAIM

This application claims priority to provisional application Ser. No. 62/118,870, filed Feb. 20, 2015, which is entirely incorporated by reference.

TECHNICAL FIELD

This disclosure relates network component monitoring.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in network issue diagnosis, including improvements in data path condition monitoring, will further enhance performance of data networks.

DETAILED DESCRIPTION

The discussion relates to architectures and techniques for monitoring network conditions. The architecture discussed below may allow for network element specific monitoring for periods before and after triggering events. For example, when an egress tile of a packet switching device drops a packet, descriptors of conditions occurring (e.g. text strings, data values, or data structures) before and after the packet drop may be stored in buffers accessible to processors in a control plane or application layer. In various implementations, conditions surrounding triggering events for various network components may be captured in buffers and accessed for monitoring, diagnosis, response, or any combination thereof. The architecture may be used for debugging transient conditions that lead to packet drops or latency violations.

Figure 1:
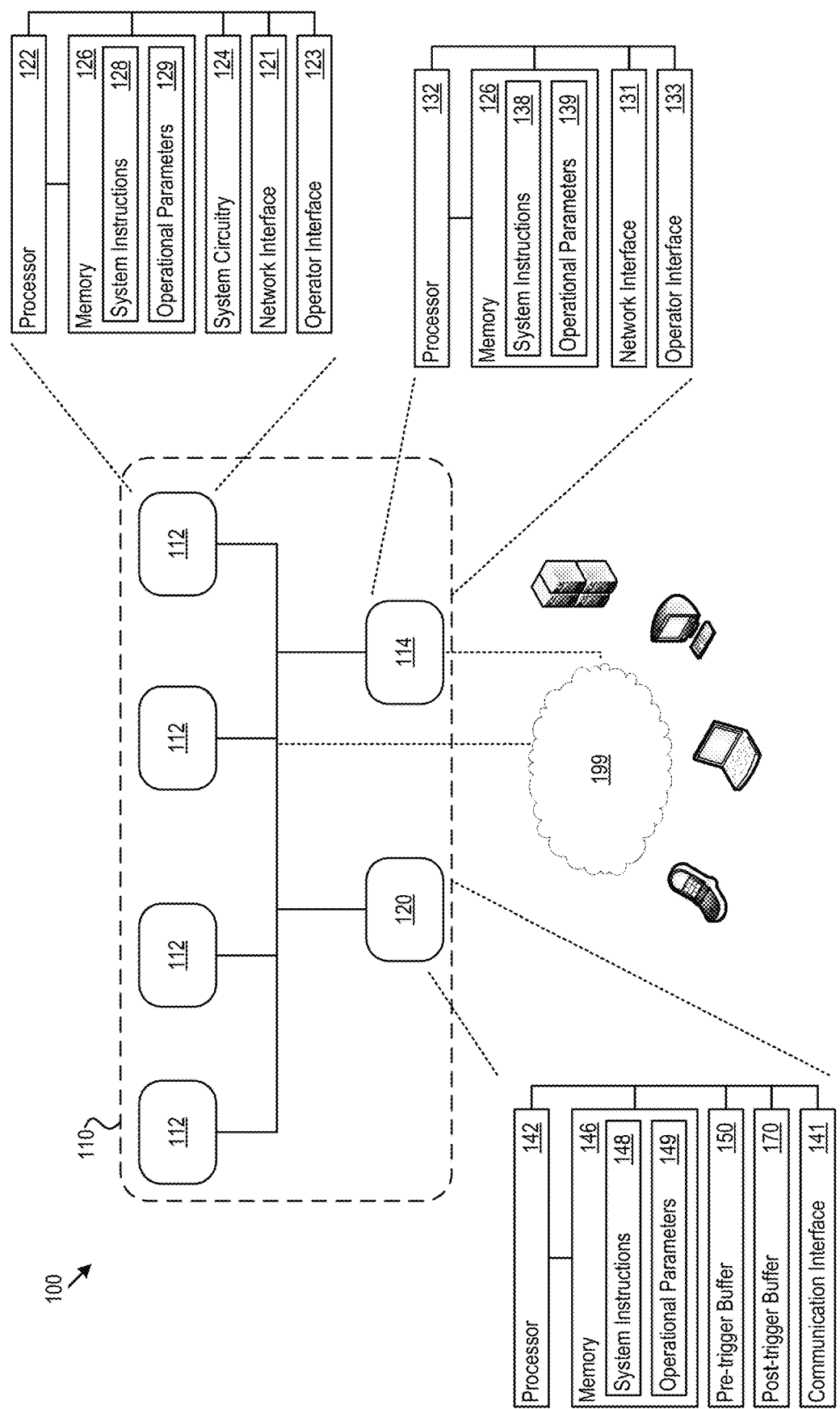
FIG. 1 shows an example monitoring environment.

FIG. 1 shows an example monitoring environment 100. A network 110 may include various network elements 112, such as packet switching devices or other nodes, which may perform network operations. For example, a monitored packet switching device may perform Layer 2 (L2) or Layer 3 (L3) switching. The network elements 112 may include one or more processors 122 to support the network operations. The network elements 112 may include memory 126 for execution support and storage of system instructions 128 and operational parameters 129. The instructions 128 and operational parameters 129 may be implemented to control one or more network operations by the network element 112. The network element may further include system circuitry 124. For example, the system circuitry 124 may include, as examples, a switch fabric, ingress tiles, and egress tiles used in network operations such as packet switching or routing. In some cases, the system circuitry may be used to perform lookup operations such as exact match or wild card match operations. In other cases, the system circuitry 124 may support synchronization operations, packet queuing, or other network operations. The network element may further include an operator interface 123, which may include human interface devices such as displays, touch panels, or other interface devices. The network element 112 may include a network interface 121, configures to support communication links over wired (e.g., Ethernet (802.3 Family), Optical, or other wired connections) or wireless connections (e.g., wireless local area networks (802.11 Family), LTE/LTE-A, 3G, other cellular or other wireless connections).

The network 110 may further include a host system 114. The host system 114 may include one or more processors 132 to support the network operations. The host system 114 may include memory 136 for execution support and storage of system instructions 138 and operational parameters 139. The instructions 138 and operational parameters 139 allow the host system 114 to access buffer content, e.g., buffers 150, 170, following trigger events. The host system may also be coupled to a terminal or other operator interface device 133 to allow an operator view and respond to collected information on network element status and events. The host system 114 may include a network interface 131, configured to support communication links over wired (e.g., Ethernet (802.3 Family), Optical, or other wired connections) or wireless connections (e.g., wireless local area networks (802.11 Family), LTE/LTE-A, 3G, other cellular or other wireless connections).

The network may also include buffer management monitoring circuitry (BMMC) 120. The BMMC 120 may monitor network element status and events and determine when to record status information, e.g., packet drops, packet delays, traffic ingress/egress, queue levels, environmental conditions, of other information, for the network elements 112. The recorded information may be associated with specific network elements 112. The BMMC 120 may be used in the generation of reports following a trigger event. Status information before and after a trigger event may be provided with network element (or network element component) resolution and at, for instance, per-packet time scales.

The BMMC 120 may include one or more processors 142 and memory 146. The BMMC may further include buffers 150, 170. The pre-trigger buffer 150 may store events and status information leading up to a trigger event. The post-trigger buffer may store events and status information after the trigger event. In various implementations the pre-trigger 150 and post-trigger buffers may include physically separate memory elements. However, in some cases, the buffers 150, 170 may be implemented as defined memory locations in a single physical memory unit. In some implementations, the buffers 150, 170 may be implemented as a logically unified circular buffer. The unified buffer may record pre-trigger events. Once the trigger criterion is met, the unified buffer may record events unit a freeze condition is met. In some cases, as will be describe below, the freeze condition may be selected such that the post-trigger event recording overwrites a portion of the unified buffer. Thus, at the time recording freezes, a portion of the unified buffer holds records of events prior to the trigger event and a second portion holds records of events after the trigger event. The memory 146 may further include operational parameters 149 and system instructions 148, which may define conditions for buffer capture, triggering criteria, and conditions for buffer access via host systems 114. The BMMC 120 may include a communication interface 141, able to support communication links over wired or wireless connections, bus protocols, or other communication links. In some cases, a companion buffer 180 may also be present within the system. The companion buffer 180 may record event entries alongside the BMMC 120 as described below.

Devices 199 may be coupled to the host computer 114 or network 110. For example, the device 199 may include cloud or remote devices from which an operator may control the host system or other portions of the network.

Figure 2:
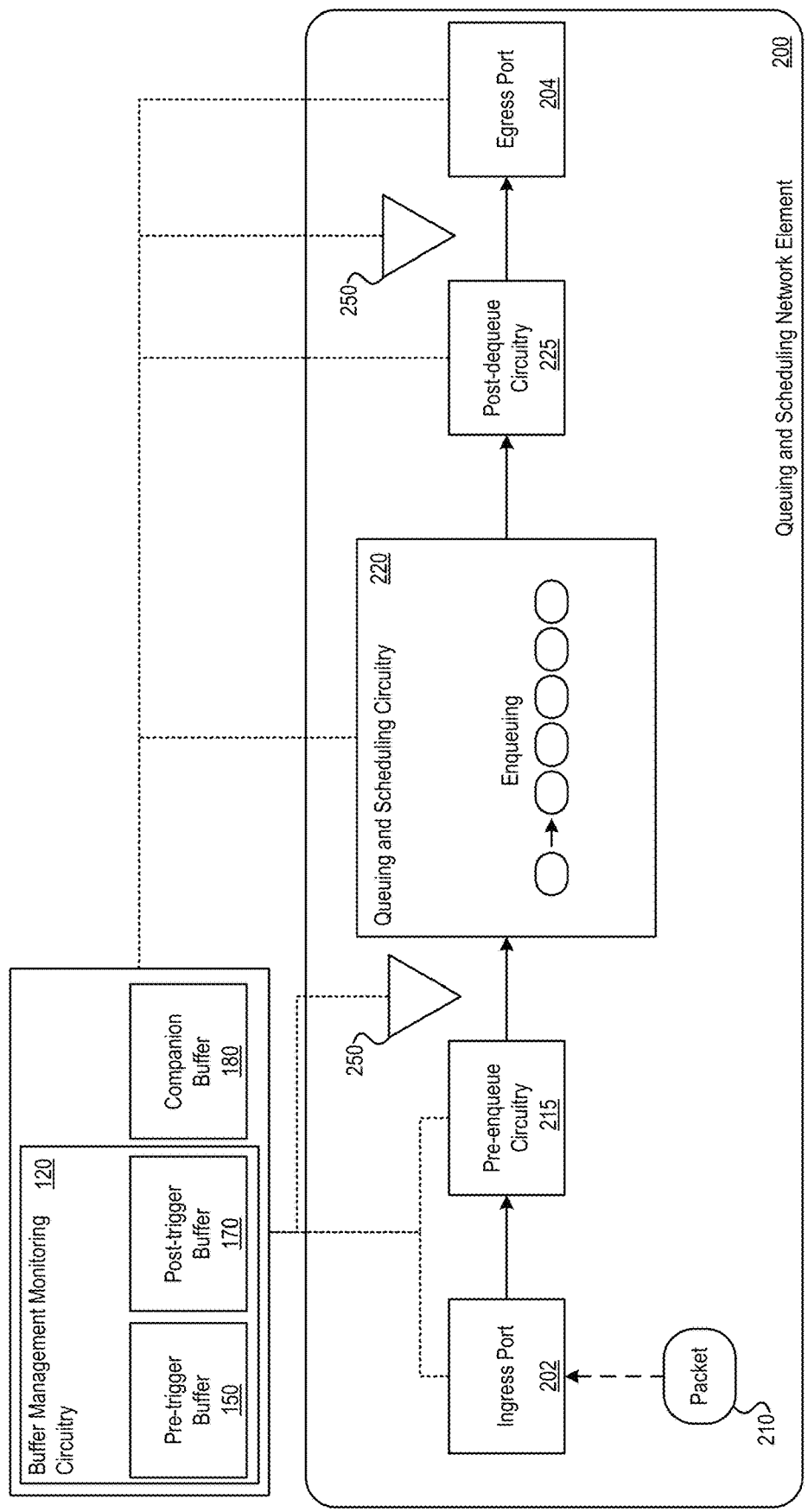
FIG. 2 shows example queuing and scheduling network element.

FIG. 2 shows an example queuing and scheduling network element (QSNE) 200. The QSNE may act as a network element 112 from FIG. 1. The QSNE 200 may include an ingress port 202 and an egress port 204. A packet 210 may arrive at the ingress port and be characterized (e.g. flow identification, or other characterization) by the pre-enqueue circuitry 215. The queueing and scheduling (QS) circuitry 220 may determine whether the packet 210 may be admitted to the queue or will be dropped prior to enqueuing. Once admitted to the queue, the packet 210 may flow to the post-dequeue circuitry 225 for packet processing. Packet processing may include flow control actions, metering, packet editing (e.g., header updates, virtual local area network (VLAN) tagging, tunneling operations, bridging or other network processing. The packet may then flow to the egress port for forwarding to the next node in the path to the packet destination.

The BMMC 120, may monitor the various components of the QSNE 200. For example, if the QS circuitry 220 holds a packet for extended period resulting in a delay, the BMMC 120 may record a corresponding entry. Similarly, the BMMC may record the occurrence of a dropped packet from the QS circuitry 220. The BMMC 120 may be in a general recording state, as discussed below, so the BMMC may also record the events for packets that are not necessarily delayed or dropped. For example, queue departure events may be recorded in the buffer entries. Additionally or alternatively, packet arrivals to a queue may also spur event recordation. Event records may include queue level, queue number, shared packet buffer depth, physical ingress & egress ports, virtual source & destination ports, event types, or other metadata. Further, the BMMC 120 may record status information surrounding a switching operation. For example, the BMMC 120 may collect voltage levels, temperature data, or other circuit condition data using sensors 250. In some cases, the BMMC 120 may collect network status information such as queue levels, transmit buffer states, or other network condition data. The BMMC 120 may also perform random sampling to capture a sample of status information from a broader time period to, e.g., identify more gradually occurring transient conditions. For example, random sampling may be used to adjust the pre-trigger interval that is recorded in buffer 150. Additionally or alternatively, random sampling may be used to customize buffer usage for various applications, e.g., buffer usage optimization.

The BMMC 120 may operate using multiple criteria. For example, the BMMC 120 may begin recording entries in the pre-trigger buffer responsive to a first criterion. For example, a QSNE 200 may have a queue level above a given threshold. In another example, one of the components in the QSNE 200 may be delaying or dropping packets where the criterion caps the number of dropped packets or sets an allowed delay threshold. The first criterion may also involve a packet attribute. For example, a first criterion may include receiving a packet from an elephant flow at an ingress port. The multiple network elements that are monitored by the BMMC 120 may define the capturing scope of the BMMC 120 of the BMMC 120. Monitored network elements in the capturing scope that meet the first criterion may be added to a qualified set for which the BMMC records entries (e.g., events, status, or a combination thereof). In some cases, a first network element meeting the first criterion may result in event recording for as set of the network elements in the capturing scope that are associated with the first network element. For example, a group of nodes along a network overlay may be placed into a set, because high traffic levels at a node of the overlay may indicate that high traffic levels are impending for the other nodes in the overlay. The BMMC may record entries for the qualified set while the members of the set meet the criterion. As the members fall short of the first criterion, the members may be dropped from the qualified set and recording for those network elements may cease.

In various implementations, while recording for the qualified set, the BMMC may record entries in a circular buffer, such that older entries are overwritten with newer entries once the circular buffer fills.

When a triggering criterion is met, the BMMC may hold the contents of the pre-trigger buffer 150 and begin recording entries from the triggering network element in the post-trigger buffer 170.

The triggering criterion may include a specific event such as a dropped packet, a delayed packet, or other event. Additionally or alternatively, the trigger criterion may be a stricter version of the first criterion for entry into the qualified set. For example, a first queue level threshold may serve as the first criterion and a second queue level threshold greater than the first may serve as the triggering threshold. In some cases, where the first criterion is itself an event (e.g., dropped or delayed packets, or other events), the triggering criterion may include the occurrence of multiple occurrences of the event or multiple different events. Hence, the first criterion may be likely to be met before the triggering criterion is met. For example, a queue level threshold may likely be violated before a packet drop occurs. However, for some event-type criteria, the trigger threshold may be met prior to any first criterion for set qualification being met. Thresholds may be defined as percentage values of total queue capacities, absolute values, or other quantities. Packet attributes, such as, elephant flow association may also serve as trigger events.

In some cases, the first criterion for set qualification may be omitted and all network elements in the capturing scope may have events recorded in the pre-trigger buffer. In some cases, random sampling may be used to achieve monitoring over longer time periods. In some implementations, the density of the random sampling may be inversely proportional to the number of network elements in the qualified set.

In various implementations, an operator, e.g., from a host terminal, may be able to generate a trigger event through operator input. Thus, a trigger may occur at an operator defined time or at operator defined intervals.

After triggering, the post-trigger buffer may record entries. Once, the post-trigger buffer fills, the contents of the post-trigger buffer are held and a freeze condition message is sent to the host system 114. In response, the host system 114 may retrieve the contents of the pre-trigger and post-trigger buffers and return the BMMC 120 to the pre-qualified non-recording state. In cases with no qualifying first criterion, the host system 114 may return the BMMC 120 to the qualified state with recording.

In some cases, the freeze condition may be implemented using a counter or timer. A counter may count the number of entries recorded after the trigger condition. This may ensure that a set number of events post trigger are recorded. In an example scenario, a BMMC may implement a unified buffer. The counter may ensure that, after overwriting some pre-trigger entries with post-trigger entries, a determined portion of the unified buffer may be dedicated to pre-trigger entries and a second determined portion of the unified buffer may be dedicated to post-trigger entries. A timer may also be used to control the number of post-trigger recordings before a freeze condition is met.

In some case, a counter-timer combination may be used. The counter may be used to set the number of recordings before a freeze condition and the timer may be used to set the amount of time that may elapse after the trigger event. Thus, if traffic is rapid, the counter may stop the system from recording more post-trigger entries that intended. Further, if traffic is slow, the timer may initiate the freeze condition to prevent the post trigger phase from continuing for an indefinite period.

Figure 3:
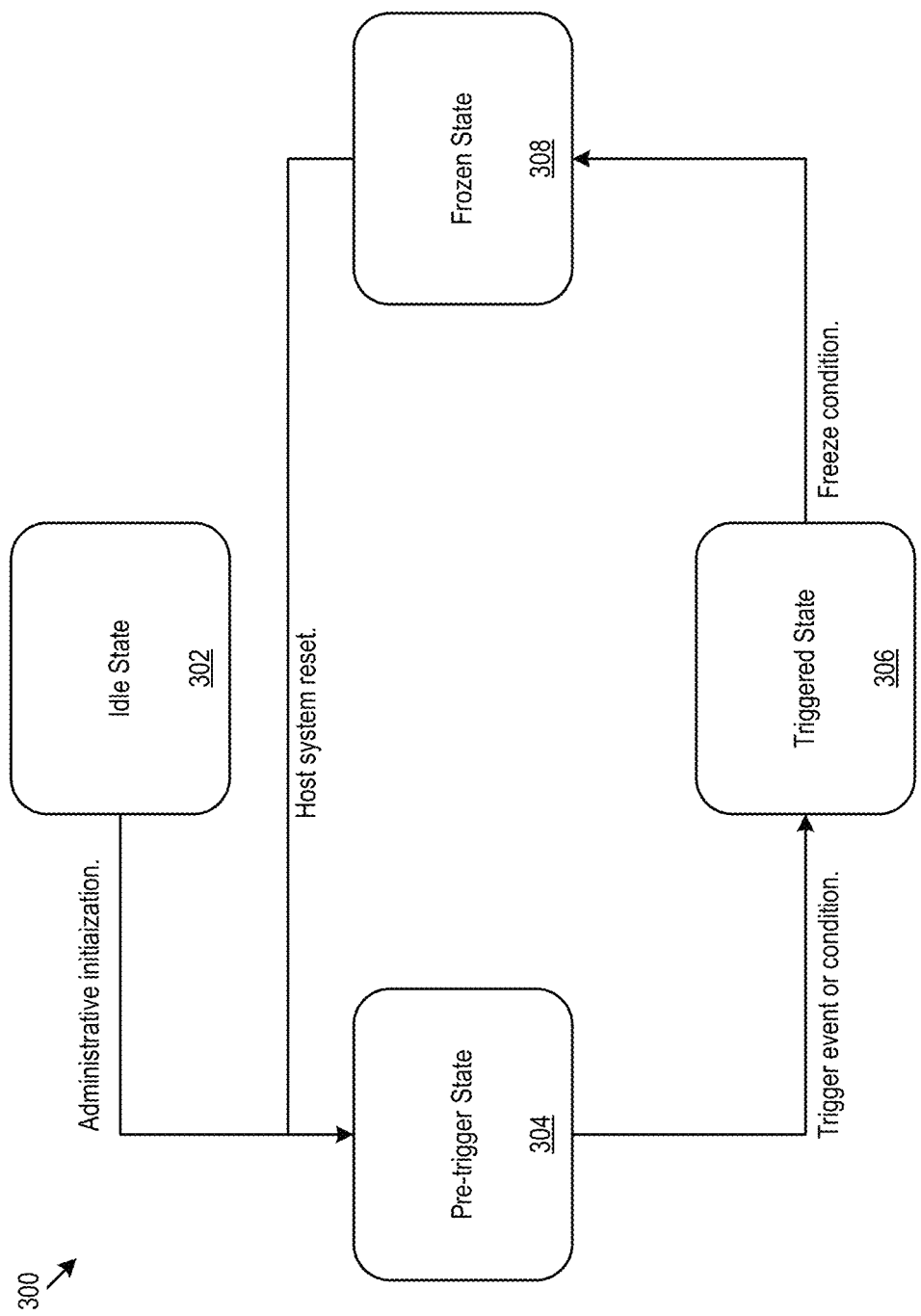
FIG. 3 shows example capture state logic, which may be implemented by buffer management circuitry.

FIG. 3 shows example capture state logic 300, which may be implemented by BMMC 120. In the idle state 302, the system may be configured for operation. For example, various criteria may be set by an operator and other system parameters may be initialized. The capture state logic 300 may be transferred from the idle state 302 to the pre-triggered state via administrative initialization. In the pre-trigger state 304, the BMMC may monitor the network elements within the capture scope. Once a network element meets the first qualifying criterion, the capture state logic 300 may transition the network element into the qualified set and record entries for the qualified network elements within the qualified set. When a trigger event or condition occurs, the capture state logic may transition into the triggered state 306 and record entries for the triggering network element. In the triggered state 306. In some cases, the capture state logic 300 may transition directly to the triggered state 306 if a trigger condition occurs without a qualifying condition occurring first. Once the freeze condition is met, the capture state logic 300 may transition to the frozen state 308 and the contents of both the pre- and post-trigger buffers are held constant. As discussed above the freeze condition may be met by a timer expiring, a counter reaching a terminal count, or through other pre-determined conditions. The BMMC 120 may cause the host system to access the content of the buffers. Once the host system has accessed the buffers, the capture state logic 300 may transition back to the pre-trigger state 304.

In some implementations, events or conditions meeting qualifying or triggering criteria may be identified by a reason or error code attached to the event or condition. For example, a packet may be dropped due to congestion or dropped at buffer or queue admission. In some cases, a packet may be dropped because it has been associated with a flow that has expired or be otherwise abandoned. Responsive the reason, certain instances of network elements meeting the defined qualifying and/or triggering criteria the occurrence may be selectively ignored. For example, when a packet is dropped for a reason specific to the packet rather than the network element, a network element may technically meet a packet drop type criterion. In the example, the instance of the network element meeting the criterion may be ignored.

Figure 4:
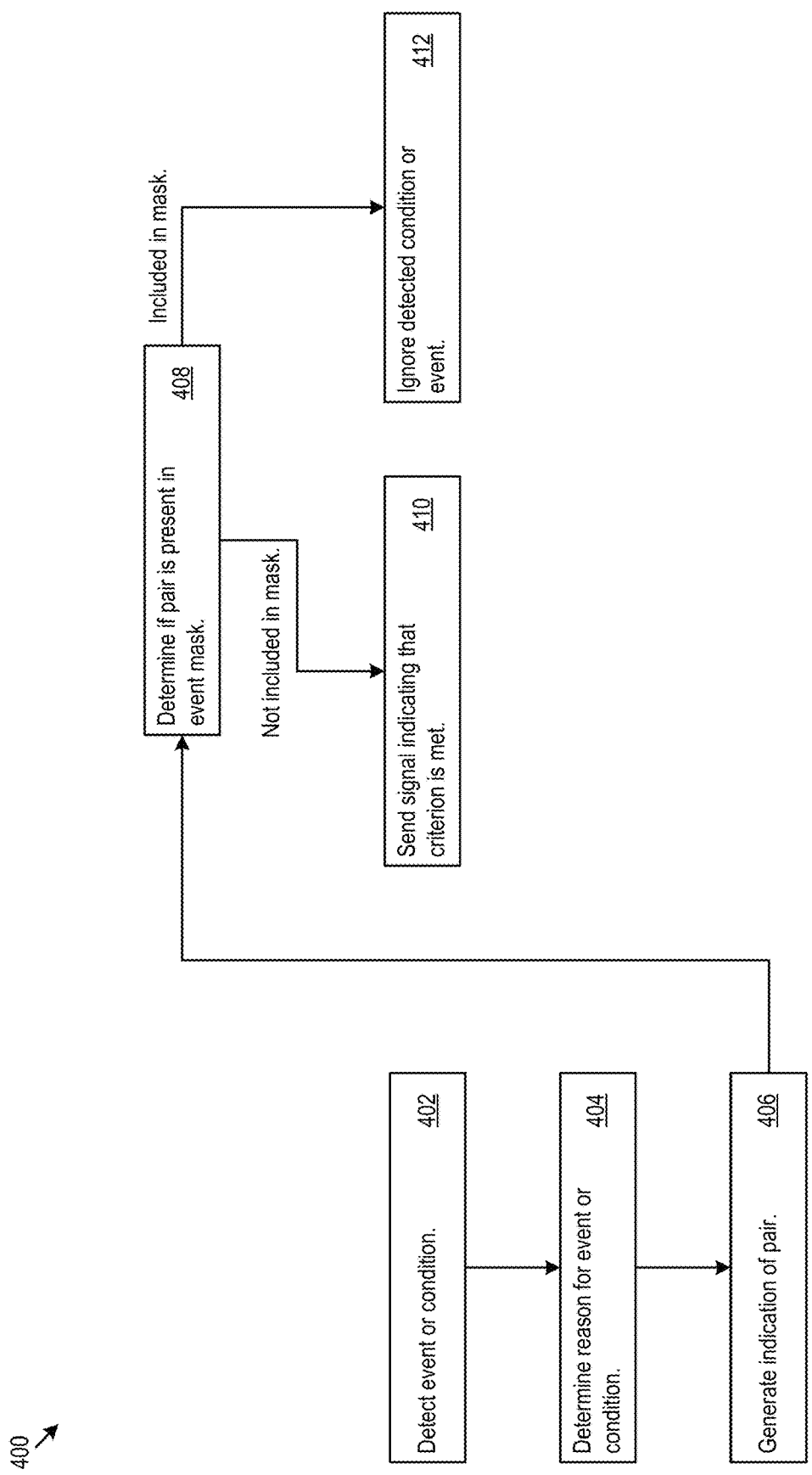
FIG. 4 shows example criterion detection logic, which may be implemented by buffer management circuitry.

FIG. 4 shows example criterion detection logic 400, which may be implemented by BMMC 120. The criterion detection logic 400 may detect an event or condition (402). The criterion detection logic 400 may determine a reason associated with the event or condition (404). For example, the reasons may include queue level conditions, operator instructions, flow specific operations, latency issues, abort notifications, delivery failures, or other reasons. The criterion detection logic 400 may generate an indication of the pair (e.g., the reason along with the detected event or condition) (406). The criterion detection logic 400 may compare the event or condition and determined reason to an event mask (408). The event mask may be used to determine whether an event or condition should be ignored be the BMMC 120. For example, the event mask may include may include pairs of events or conditions and reasons that may be ignored when determining if a criterion is met. If the pair is not in the event mask, the criterion detection logic 400 may signal to the capture state logic 300 that a criterion has been met (410). If the pair is included within the event mask, the criterion detection logic 400 may ignore the event or condition and wait for a new detected event or condition (402).

Figure 5:
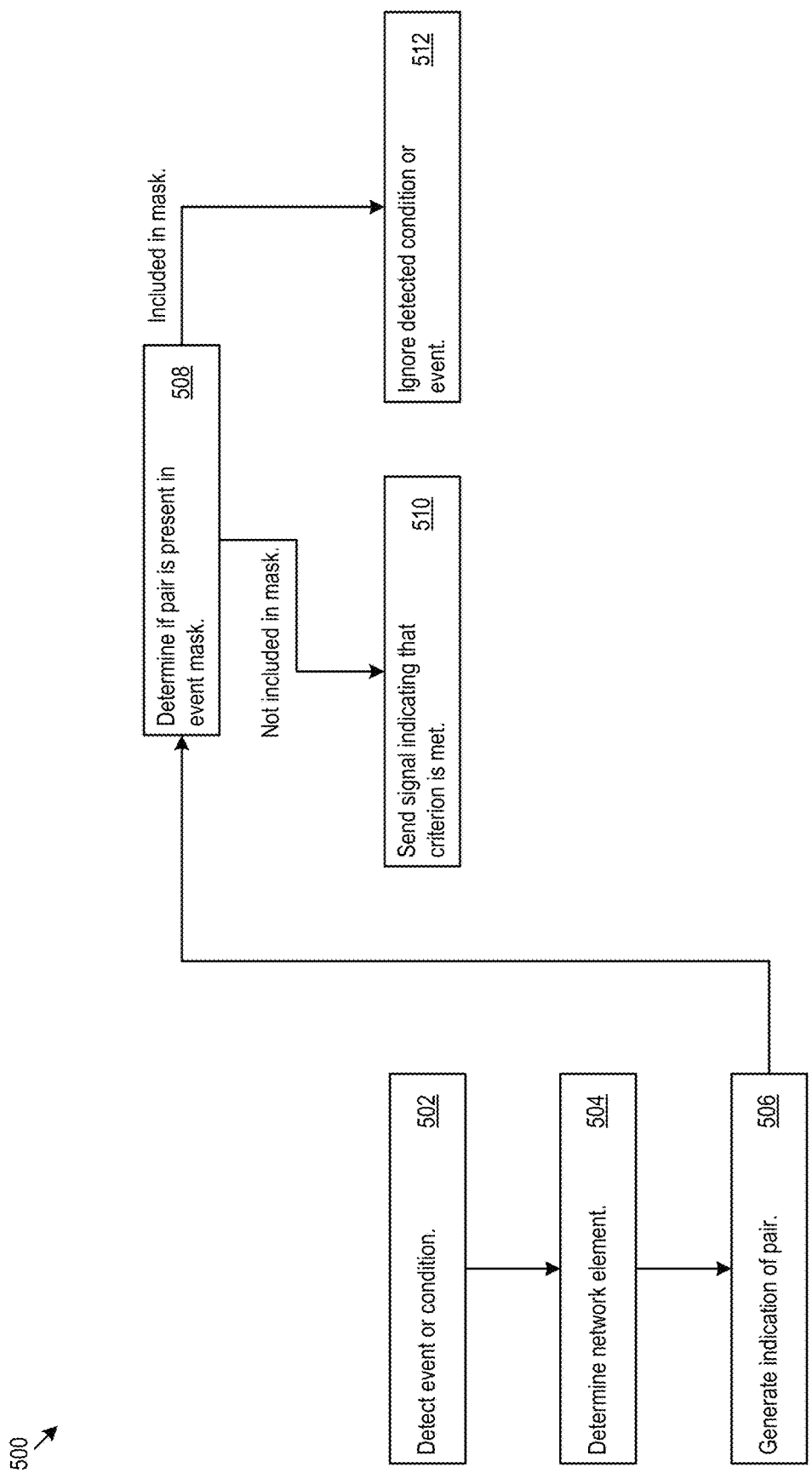
FIG. 5 shows another example criterion detection logic, which may be implemented by buffer management circuitry.

FIG. 5 shows another example of criterion detection logic 500, which may be implemented by BMMC 120. The criterion detection logic 500 may detect an event or condition (502). The criterion detection logic 400 may determine a network element associated with the event or condition (504). The criterion detection logic 500 may generate an indication of the pair (e.g., the network element and the detected event or condition) (506). The criterion detection logic 500 may compare the event or condition and determined network element to an event mask (508). For example, the event mask may include may include pairs of events or conditions and network elements that may be ignored when determining if a criterion is met. If the pair is not in the event mask, the criterion detection logic 500 may signal to the capture state logic 300 that a criterion has been met (510). If the pair is included within the event mask, the criterion detection logic 500 may ignore the event or condition (512) and wait for a new detected event or condition (502).

When recording an entry, the BMMC 120 may capture various data elements. For example, the BMMC 120 may capture a portion of a packet associated with the entry. For example, the packet may be a packet dropped or delayed by the network element. Additionally or alternatively, the packet may be a packet currently being handled by the network element. The BMMC may capture fields (e.g., an N-tuple) from the packet header or the first number of bytes from the packet. Meta-data for the packet may also be added to the entry. For example, time-stamps, queue numbers, queue depths, share packet buffer depths, physical ingress and egress ports, virtual source and destination ports, or other meta-data. Additionally or alternatively, sensor data collected from environmental sensors on the network elements may be added to entry. For example, data from temperature or voltage sensors may be added to the entry.

In some implementations, the qualifying criterion may include a start criterion and a stop criterion. In this case, when a network element or set of network elements meets the start criterion they may join the qualified set. However, once in the qualified set, members may not necessarily drop out until falling below the stop criterion. In some cases, the stop criterion may be less strict than the start criterion. This difference may prevent network elements from qualifying and then rapidly disqualifying when the condition of the network element hovers near the start criterion.

In some cases, queues may have individual start and stop criterion. The BMMC 120 may define indices with start and stop threshold pairs. For example, with eight pairs of start and stop thresholds the individual indices may be defined using three bits.

In various implementations, a third companion buffer 180 may be used by the BMMC. The companion buffer 180 may be used to store entries associated with the trigger criterion. The companion buffer 180 may continue to record entries for trigger events for various network elements within the capture scope even if the buffers 150, 170 are recording entries only for the triggering network element. Thus, the companion buffer may store entries specific to events that meet the trigger criterion rather than events and surrounding one instance of the trigger criterion being met. In some cases, the companion buffer may hold its contents until the freeze condition is met. In an example scenario, a trigger event may occur. The BMMC 120 may bind to the network element associated with the trigger event. Therefore, in this example scenario, the buffers 150, 170 may focus on this first triggering network element for recording. In the example scenario, if other network elements in the capture scope experience trigger events, the buffers 150, 170 may not necessarily record entries. However, the companion buffer 180 may continue to monitor network elements within the capture scope and may record entries for events meeting the trigger criterion.

The host system 114 may notify the operator with a pop-up or push message when information of interest is captured. For example, the notification may arrive over cloud or remote devices 199. For example, the host system 114 may notify the operator when a criterion is met, a freeze condition is met, or at other intervals. The BMMC 120 may send notifications to host system we various criteria are met to facilitate operator notification. The operator may set parameters to control when the host system provides notifications.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
    prior to a first criterion being met by a first network element in a network comprising multiple network elements that are part of a capture scope, recording events corresponding to the first network element in a first buffer;
    in response to the first criterion being met by the first network element as a triggering network element of the multiple network elements, beginning to record events corresponding to the triggering network element in a second buffer;
    in response to the second buffer meeting a freeze criterion, capture state logic for the first buffer and second buffer transitions to a frozen state:
        holding content of the second buffer static;
        causing a host processor to access the content of the first and second buffers and subsequently transitioning back the capture state logic to a pre-trigger state; and
        adjusting a recording time interval for recording events after the first criterion is met based on a sampling of events over a broader period of time than a period of time for which events are recorded in the first buffer after the first criterion is met; and
    in a third buffer, recording events that occur in network elements other than the first network element that are in the capture scope, the third buffer continues to record events during the frozen state.

2. The method of claim 1, wherein the first criterion comprises a threshold a values.

3. The method of claim 2, wherein the threshold comprises at least one of an egress buffer level threshold, an ingress buffer level threshold, or any combination thereof.

4. The method of claim 1, further comprising overwriting a recorded event in the first buffer when the first buffer fills.

5. The method of claim 4, wherein the recorded event comprises an oldest recorded event in the first buffer.

6. The method of claim 1, wherein the recording an event in the second buffer comprises overwriting an entry in the first buffer.

7. The method of claim 1, wherein the triggering network element meets the first criterion by dropping a packet responsive to congestion, buffer admission, or both.

8. The method of claim 1, further comprising recording events corresponding to a second network element in the first buffer responsive to the first criterion being met by the first network element.

9. The method of claim 1, further comprising:
    recording the sampling of events.

10. The method of claim 1, further comprising:

defining a qualified group from among the multiple network elements;

adding the first network element to the qualified group when the first criterion is met by the first network element; and after adding the first network element to the qualified group, removing the first network element from the qualified group responsive to the first element failing to meet the first criterion.

11. A device comprising:

buffer circuitry configured to record event entries, the buffer circuitry including capture state logic;

a communication interface in data communication with the buffer circuitry, the communication interface being configured to allow a host processor to access the event entries in the buffer circuitry; and monitoring circuitry configured to:

monitor multiple network elements that are part of a capture scope;

prior to a first criterion being met by a first network element of the multiple network elements, cause the buffer circuitry to record event entries for the first network element in a first buffer;

in response to the first criterion being met, cause the buffer circuitry to record event entries for the triggering network element in a second buffer;

in response to a freeze condition being met, cause the capture state logic of the buffer circuitry to stop recording event entries, and transition the capture state logic back to a pre-trigger state after the event entries are read from the buffer circuitry for the triggering network element;

adjust a recording time interval for recording events after the first criterion is met based on a random of events over a broader period of time than a period of time for which events are recorded in the first buffer after the first criterion is met; and in a third buffer, record events that occur in network elements other than the first network element that are in the capture scope, the third buffer continues to record events during the freeze condition.

12. The device of claim 11, wherein the buffer circuitry is configured to record a first event over a second event when the buffer circuitry is full.

13. The device of claim 12, wherein:

the first event comprises a newest event; and the second event comprises an oldest event.

14. The device of claim 11, wherein the monitoring circuitry is configured to:

cause the buffer circuitry to record event entries for the first network element by recording the sampling of events.

15. The device of claim 11, wherein the buffer circuitry is configured to record an event by recording, a status condition, a time stamp, a network element identifier, or any combination thereof.

* * * * *